United States Patent [19]

Beierle

[11] Patent Number: 5,309,378
[45] Date of Patent: May 3, 1994

[54] MULTI-CHANNEL ADAPTIVE CANCELER

[75] Inventor: Robert T. Beierle, Diamond Bar, Calif.

[73] Assignee: Hughes Aircraft Company, Los Angeles, Calif.

[21] Appl. No.: 39,713

[22] Filed: Mar. 30, 1993

Related U.S. Application Data

[63] Continuation of Ser. No. 794,633, Nov. 18, 1991, abandoned.

[51] Int. Cl.⁵ ............................................. G06F 15/20
[52] U.S. Cl. .............................. 364/574; 364/724.19
[58] Field of Search .............. 364/574, 724.19, 724.20, 364/572, 76.21, 76.28; 381/46, 47, 71, 73.1, 94; 73/613, 611, 593; 367/901

[56] References Cited

U.S. PATENT DOCUMENTS

| | | | |
|---|---|---|---|
| 4,038,536 | 7/1977 | Feintuch | 364/724.19 |
| 4,038,539 | 7/1977 | Van Cleave | 364/724.19 |
| 4,243,935 | 1/1981 | McCool et al. | 324/77 |
| 4,355,368 | 10/1982 | Zeidler et al. | 364/728 |
| 4,537,200 | 8/1985 | Widrow | 128/696 |
| 4,556,962 | 12/1985 | Widrow | 367/45 |
| 4,574,166 | 3/1986 | Gritton | 179/170.2 |
| 4,587,620 | 5/1986 | Niimi et al. | 364/574 |
| 4,589,137 | 5/1986 | Miller | 381/71 |
| 4,594,695 | 6/1986 | Garconnat et al. | 367/901 |
| 4,641,259 | 2/1987 | Shan et al. | 364/724 |
| 4,649,505 | 3/1987 | Zinser, Jr. et al. | 364/574 |
| 4,658,426 | 4/1987 | Chabries et al. | 381/94 |
| 4,703,447 | 10/1987 | Lake, Jr. | 364/724.16 |
| 4,719,466 | 1/1988 | Farina et al. | 364/574 X |
| 4,773,034 | 9/1988 | Debus, Jr. | 364/724.2 |
| 4,791,390 | 12/1988 | Harris et al. | 364/724.19 X |
| 4,811,261 | 3/1989 | Kobayashi et al. | 364/724.19 |
| 4,868,775 | 9/1989 | Kobayashi et al. | 364/724.19 |
| 4,965,834 | 10/1990 | Miller | 381/94 |
| 5,029,118 | 7/1991 | Nakajima et al. | 364/574 |
| 5,157,596 | 10/1992 | Alcone | 364/574 |

OTHER PUBLICATIONS

"An Application of the Cooley-Tukey Algorithm to Equalization" IBM Journal of Research & Development pp. 331–334.

"Adaptive Noise Cancelling:Principles and Applications" Widrow et al. Proceedings of the IEEE, vol. 63 No. 12 Dec. 1975.

"Adaptive Noise Canceling Applied to Sinusoidal Interferences" by John R. Glover, Jr. IEEE vol. AS-SP-25, No. 6 Dec. 1977.

"Analog and Digital Filters", LAM, Prentice-Hall 1979 Chapter 13 Realization of Digital Filters.

Primary Examiner—Kevin J. Teska
Assistant Examiner—Ellis B. Ramirez
Attorney, Agent, or Firm—W. K. Denson-Low

[57] ABSTRACT

Disclosed is an adaptive canceler in which a pipelined approach is used wherein reference signals are divided into two or more sections having concurrent weight adjustment. This architecture allows the speed of adaptive cancellation to be increased and/or the number of reference taps to be increased without loss of cancellation speed. Once a continuous stream of digital data has been established in this architecture, the speed of the adaptive processor is limited only by approximately the processing time of the slowest element. The noise canceled signal may then be converted to the frequency domain in a fast Fourier transform device.

1 Claim, 8 Drawing Sheets

MULTI-CHANNEL ADAPTIVE CANCELER

This is a continuation of application Ser. No. 07/794,633 filed Nov. 18, 1991 now abandoned.

BACKGROUND

The present invention relates generally to adaptive noise suppression and, more particularly, to adaptive noise cancellation processing and comparative analysis for operating equipments or machinery. The invention relates especially to such apparatus which performs such adaptive cancellation processing and comparative analysis continuously in real time.

Although conventional performance measurements may provide an indication of defects or potential defects in operating equipments of machinery, typically only gross or catastrophic defects will be identified. Relatively few latent defects are discovered by such measurements. However, the acoustic signals emanating from an operating apparatus (acoustic signature) may contain information which identifies not only the present defects which could be found by performance measurements but also latent defects or potential defects which could lead to subsequent failures of the apparatus. Acoustic-frequency signals radiated from operating apparatus, for example apparatus having moving parts, can contain valuable information with respect to the present and future performance of the apparatus.

However, the acoustical analysis of operating components can be a difficult task. Background noise at acoustic-frequencies can mask the acoustical signals radiated from the component being examined. In the testing of a component in a factory environment for example, noise from test-stand machinery, noise from other components under test, and ambient factory noise may obscure the signals of interest radiating from the component under test. It may be possible to isolate the desired acoustical signatures using sound intensity techniques; however, in an environment where speed of analysis is important, an unacceptable amount of time is required to perform an acoustic intensity analysis due to the large number of measurements necessary to achieve sufficient accuracy. In cases where the background noise varies greatly or is unpredictable, sound intensity techniques will generally be unsatisfactory. Isolating and analyzing the acoustical signature of operating equipment is, in general, a difficult problem in any situation where an uncontrolled operating environment exists or where large amounts of interfering signals are present.

U.S. Pat. No. 4,658,426 entitled "Adaptive Noise Suppression" issued to Chabries et al. suggests that adaptive processing can be used to diminish the adverse effects of noise distortion in processing signals from machinery wherein the desired signal provides an indicia of wear or malfunction. The basic theory of adaptive noise cancellation is well known and has been described by Bernard Widrow et al. in the article "Adaptive Noise Cancelling: Principle and Applications", Proceedings of the IEEE, Vol. 63, No. 12, December 1975, pages 1692-1716. In particular, Widrow et al. describe a generalized multiple-reference noise canceler on pages 1710-1711. In adaptive noise canceling, a signal channel and at least one reference channel are needed to provide noise cancellation. The signal channel receives a signal of interest which is corrupted by additive noise or interference. The reference channels receive noise that is correlated in some way with the additive noise or interference on the signal channel but not substantially correlated with the signal of interest. The signals which are received by the reference channels are adaptively filtered and then subtracted from the signal received by the signal channel to obtain an estimate of the signal of interest.

However, the successful application of adaptive noise cancellation to the analysis of a dynamically changing acoustic signature of apparatus operating in an environment contaminated with dynamically changing background noise has proven difficult to achieve. The adaptive processor must be able to respond to background noise which may vary widely in amplitude, frequency, and duration. Similarly, the acoustic signal of interest may vary widely in amplitude, frequency and duration. The noise signals may be very similar to the signal of interest. These obstacles facing the cancellation apparatus are especially troublesome if the processing and analysis is required to be done in real time.

Consider the case where it is desired to perform acoustic signature analysis on automotive transmissions as part of end-of-the-line quality control testing in a factory environment. The background noise may be the entire range of factory noises including any acoustic interference generated by the test fixture itself for the transmission under test and identical test fixtures for performing simultaneous testing on other transmissions. This may include the acoustic signals generated by the other transmissions undergoing test or other acoustic signals generated by the transmission under test itself. If the test is to be performed on every transmission, the entire test procedure, including acceptance or rejection of the part, must be accomplished very quickly in order to maintain the speed of the assembly line, for example in 20-30 seconds. Acoustic analysis of the transmission may be required at several different rotational speeds or revolutions-per-minute (RPM's). In one test configuration, the transmission is driven continuously from rest to the maximum test RPM and back to rest during the allotted time. The adaptive canceler apparatus must be able to provide the acoustic signal of interest for selected RPM's and must be able to capture this signal as the operating speed of the transmission passes through the selected RPM's. In terms of the frequency domain in the case of an automotive transmission, the acoustic signals of interest may vary from 10 Hz to 5 kHz and may be have a bandwidth as narrow as a few Hertz or as wide as thousands of Hertz. In the time domain, the frequencies of interest may vary from 100 milliseconds to 200 microseconds in duration. The interfering noise signals may present an even larger variation in signals to be processed. The analysis of other devices may present even more stringent requirements.

To satisfy the foregoing requirements, the adaptive canceler must be able to perform continuous real-time cancellation of widely varying background noise at very high data rates over a broad spectrum of frequencies and signal durations. The background noise may be such that multiple reference channels are required for satisfactory cancellation. In a typical situation, after the background noise has been canceled and the canceler is providing a continuous stream of real-time data corresponding to the signal of interest, it is desirable to provide real-time analysis of the data. Automatic analysis of the data is preferred, or even required as is the case in a production line test of a device such as an automatic transmission, or in situations where it is important that the analysis be accomplished quickly or almost instantaneously. The adaptive canceler and the automatic analysis system must have a throughput rate capable of handling the great volume of data produced in these circumstances.

SUMMARY OF THE INVENTION

It is therefore an object of the present invention to provide for analysis of signals emanating from an apparatus operating in an environment containing noise.

Another object is to provide for continuous real-time analysis of the signals emanating from an apparatus operating in an environment containing noise.

Still another object is to provide continuous real-time adaptive analysis of the acoustic signature of apparatus operating in an environment containing noise.

Another object is to provide for acoustic analysis of operating machinery under test in a factory environment or in an operational environment.

A further object is to provide real-time continuous cancellation of interfering signals to enable the real-time detection and/or analysis of a signal or signals of interest obscured by the interfering signals.

Another object is to provide continuous cancellation of interfering signals to enable the detection and/or analysis of an acoustic signal of interest of apparatus operating in an environment contaminated by background noise.

These objects are attained by the invention wherein there is provided an adaptive analysis apparatus having a signal channel adapted to sense an acoustic signal of interest which includes corrupting interference or noise and also having a plurality of reference channels adapted to sense such corrupting noise which is correlated with the corrupting interference or noise on the signal channel but not correlated with the signal of interest.

In the invention, a distributed pipelined approach is used wherein the reference signals are divided into two or more sections having concurrent weight adjustment. This architecture provides increased processing speed over that of prior nondistributed cancelers. The use of concurrent adaptive filtering allows the speed of adaptive cancellation to be increased and/or the number of degrees of freedom (that is, the number of reference taps times the number of references) of the adaptive filter to be increased without loss of cancellation speed. The signals received in the signal channel and the reference channels are adjusted in amplitude and filtered to optimize the adaptive cancellation process and then converted to digital signals for digital adaptive cancellation.

With the concurrent processing architecture of the invention, once a continuous stream of digital data has been established, the speed of the adaptive processor is limited only by approximately the processing time of the slowest element.

The output of the adaptive canceler, which is a continuous stream of digital words from which the correlated interference has been canceled, is directly available for time-domain signal analysis in its digital form or may be converted to analog form for analysis. In one application, the noise canceled signal may be converted to the frequency domain in a fast Fourier transform device.

BRIEF DESCRIPTION OF THE DRAWINGS

The features and advantages of the present invention may be more readily understood with reference to the following detailed description when taken in conjunction with the accompanying drawings wherein.

DETAILED DESCRIPTION OF THE PREFERRED EMBODIMENTS

Figure 1:
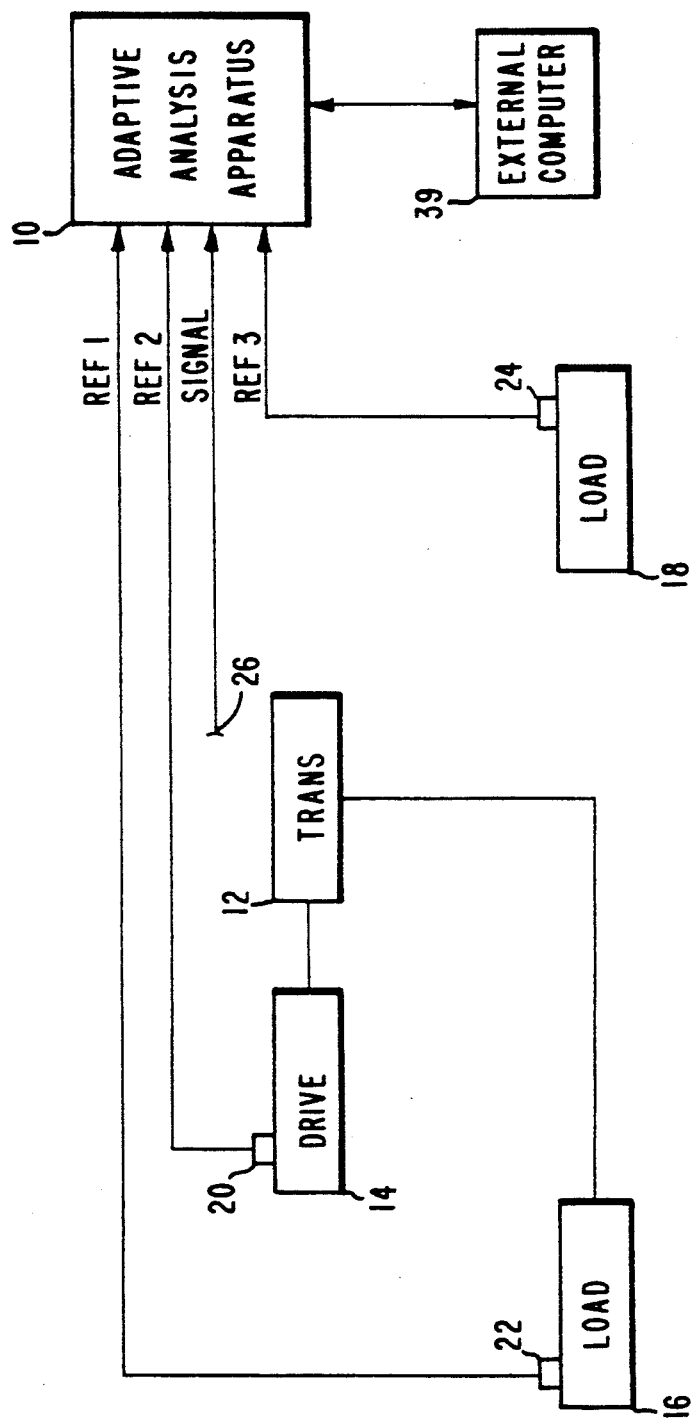
FIG. 1 is a schematic representation of an adaptive analysis apparatus connected for providing real-time signal analysis for end-of-the-line testing of an automotive transmission.

Referring now to the drawings wherein like reference numerals designate like or similar parts in the several figures, FIG. 1 schematically illustrates an adaptive analysis apparatus 10 connected for providing real-time adaptive signal analysis for end-of-the-line quality control testing of an automotive transmission 12, a setting that illustrates one of the many areas where the adaptive analysis apparatus of the invention may be employed. The transmission 12 is coupled to a drive dynamometer 14 for driving the transmission 12 at appropriate speeds for testing. The transmission 12 is also coupled to two load dynamometers 16 and 18 for applying appropriate loads to the transmission. Reference accelerometers 20, 22 and 24 are coupled to dynamometers 14, 16, and 18, respectively, for sensing vibrational energy generated by the dynamometers and other acoustic-frequency signals (such as background noise from other test fixtures or the production line in general) which may be coupled to the dynamometers. A signal microphone 26 is disposed in proximity to the transmission 12 for sensing the acoustic-frequency signals generated by the transmission (the signals of interest). This microphone 26 will also sense corrupting background noise from the dynamometers and elsewhere. The microphone 26 is not attached to the transmission 12 in this example because of the time and complexity involved in attaching and removing a sensor in the context of production-line testing. In this embodiment, a microphone and accelerometers are disclosed in a particular configuration; however, this is not meant to be restrictive of the invention. In another embodiment, accelerometers may be used exclusively, or microphones may be used exclusively, or a different combination of the two types of sensors may be used, or other types of sensors may be used, depending upon the application.

The outputs of the reference accelerometers 20, 22, and 24 and the output of the microphone 26 are coupled to the adaptive analysis apparatus 10 for adaptive cancellation of the correlated acoustic-frequency signals (noise) from the acoustic signal picked up by the microphone 26 and for automatic analysis of the resulting noise canceled signal.

Figure 2:
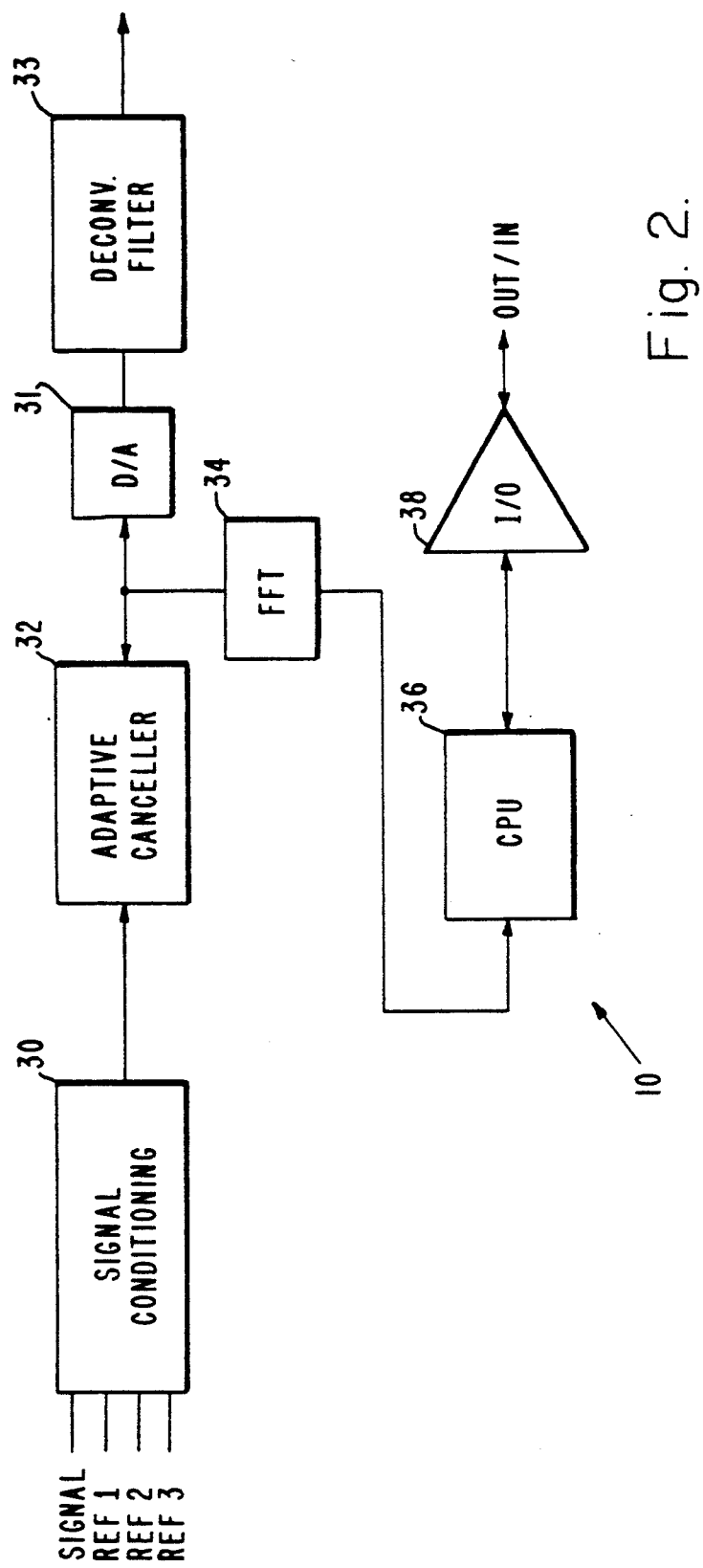
FIG. 2 is a high-level block diagram of an adaptive analysis apparatus according to the present invention.

FIG. 2 is a high level block diagram which illustrates the general architecture of an adaptive analysis apparatus 10 according to the invention. The preferred embodiment of the adaptive analysis apparatus 10 has a self-contained architecture in which a signal conditioning section 30 receives a signal input from a primary sensor (such as microphone 26) on a signal channel and a plurality of reference inputs from a plurality of reference sensors (such as accelerometers 20, 22, and 24) on a plurality of reference channels. As is well known, a signal input and at least one reference input are required for adaptive noise cancellation. In adaptive cancellation, only correlated signals are canceled from the signal channel so that any signals sensed by one of the reference channels will not have any effect unless the reference signal is correlated in some way with the signals received in the signal channel. The number of reference channels need not be limited, however, as long as there is sufficient isolation between every reference channel and the signal of interest on the signal channel to prevent correlation between the signal of interest and the signals sensed by the reference channel. The signal conditioning section 30, a preferred implementation of which is described in more detail in connection with FIG. 3 hereinafter, conditions and digitizes the primary sensor input signal and the reference input signals in order to optimize the operation of an adaptive cancellation section 32. In general terms, the signal conditioning section 30 functions to amplify, filter, sample and digitize the analog signals coupled from the sensors.

The primary sensor signal and reference sensor signals digitized in the signal conditioning section 30 are coupled to the adaptive cancellation section 32. The adaptive cancellation section 32, as will be described more fully hereinafter, adaptively cancels the reference noise signals from the primary sensor signal in order to increase the signal-to-noise ratio of the signal of interest sensed by the primary sensor.

The output of the adaptive canceler section 32 is the signal of interest in a continuous stream of digital words. This stream of digital words (also referred to hereinafter as the noise canceled signal since the corrupting background signals have been canceled) is available for analysis. The noise canceled signal can be analyzed in its digital form in the time domain or the frequency domain through further digital processing or it can be converted back to an analog signal in a digital-to-analog converter 31 in combination with a deconvolution filter 33 for analysis. The type of analysis will be determined by the setting in which the adaptive processing apparatus is used.

Frequency-domain analysis of the noise canceled signal is often desirable and may be the preferred type of analysis in the factory test setting. For frequency-domain analysis, the noise canceled digital signal may be coupled to a Fast Fourier Transform device 34 which transforms the noise canceled signal from the time domain to the frequency domain by generating a digital spectrum of the acoustic signal of interest. The digital spectrum may then be analyzed as desired.

Alternatively, time-domain processing of the signal of interest may be employed on the digital signals provided by the adaptive canceler 32. The central processing unit 36 may process time-domain signals and analyze them by integrating them over time and comparing the integrated signals to thresholds indicative of a properly operating machine. In addition, digital signals may be further processed in the central processing unit 36, or in a separate processor, to provide ordered data that may be comparatively analyzed by the central processing unit to determine status of the apparatus undergoing test.

Figure 3:
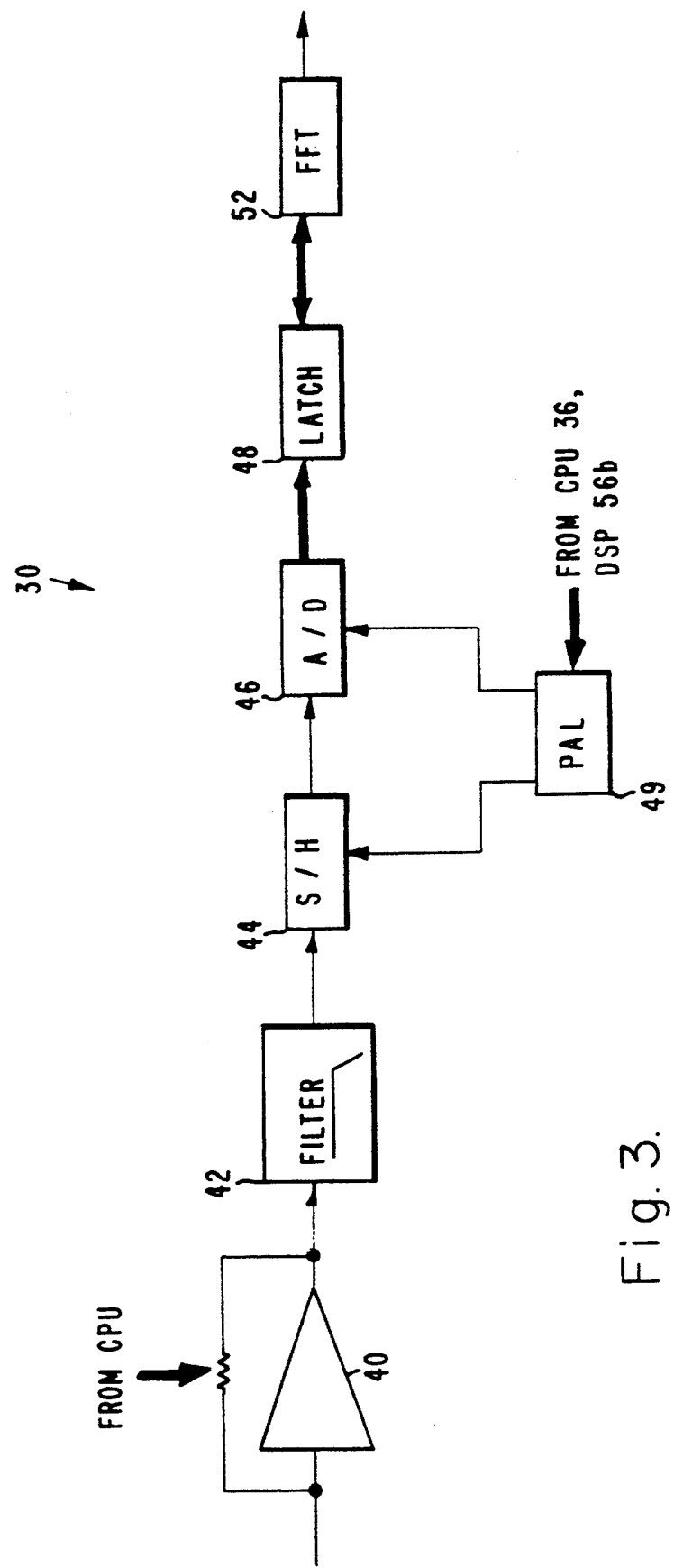
FIG. 3 is a block diagram illustrating signal conditioning circuitry which may be used with the invention.

Referring now to FIG. 3, an implementation of a signal conditioning section 30 is shown. Only one channel is shown in FIG. 3 to avoid confusion. However, in the embodiment described herein, there are four sensor channels—one signal channel and three reference channels. The embodiment apparatus 10 was designed for analysis of a signal of interest having a bandwidth from approximately 10 Hz to 10 kHz. In order to satisfy the well-known Nyquist criteria, this approximate 10 kHz bandwidth of interest requires that the signal be sampled at approximately twice (at least) the bandwidth or 20 kHz in this application. The signal conditioning circuit 30 comprises four substantially identical channels, each of which includes a digitally-programmable preamplifier 40 having a programmable gain, an anti-aliasing filter 42, a sample-and-hold circuit 44, an analog-to-digital converter circuit 46, and a buffer latch 48. In this embodiment, the digitally programmable preamplifiers 40, the sample-and-hold circuits 44 and the analog-to-digital converters 46 are Models AD526, AD356 and AD7572, respectively, manufactured by Analog Devices. The buffer latches 48 are model 74ALS244, manufactured by Texas Instruments. The operation (timing) of the sample-and-hold circuits 44 and the analog-to-digital converters are under the control of the central processing unit 36 through a Programmable Array Logic (PAL) 49.

It was found that the adaptive cancellation performs better when the signal input and the reference input(s) are approximately the same amplitude due to limitations of digital gain in the canceler section. Therefore, use of the digitally-programmable preamplifier 40 permits adjustment of the amplitude of input signals (from the sensors) for optimum cancellation and further allows the amplifier gain to be adjusted through the central processing unit 36 under operator control. Another means of providing this control is through the use of an automatic gain control (AGC) circuit applied to each preamplifier. It should be noted that the adaptive processing apparatus 10 can be used with any sensor that provides an output signal in the frequency range suitable for processing by the signal conditioning section 30.

The anti-aliasing filter 42 is, in this embodiment, a conventional Butterworth filter having a minimum of four poles and having a 10 KHz roll-off corresponding to the bandwidth of interest. As is well known, increasing the number of poles in this pre-cancellation filter 42 will improve the operation of the canceler, but it will also increase complexity of the filter. Eventually a point will be reached where the improvement in cancellation will not merit the required increase in complexity in the filter.

It should be noted that the design of the reference channels and the placement of the sensors should not produce phase distortion or delay that is sufficient to cause the reference channel signals to be decorrelated relative to the primary channel signal.

The adaptive analysis apparatus 10 can be modified to operate at a larger bandwidth if the sampling rate and the anti-aliasing filter are correspondingly changed. Signals of different frequencies (including signals above acoustic-frequencies) can be analyzed if the input signals to the adaptive analysis apparatus 10 are frequencyshifted to the operating frequency of the adaptive analysis apparatus 10.

The adaptive canceler section 32 is illustrated in FIGS. 4, 5, 6, 7, and 8. The so-called Least Means Square (LMS) algorithm is the preferred adaptive algorithm to control the operation of the adaptive canceler 32. See Bernard Widrow et al. "Adaptive Noise Cancelling: Principle and Applications", Proceedings of the IEEE, Vol. 63, No. 12, December 1975, pages 1707-1709 for a description of the LMS algorithm. The adaptive canceler 32 obtains improved throughput of adaptively processed data by using a distributed processing architecture to establish a pipelined processing flow. The distributed canceler architecture of the present invention can provide a large number of taps and a large number of degrees of freedom while at the same time allowing increased throughput over prior cancelers. The architecture can be expanded to increase throughput to an almost unlimited extent and/or to dramatically reduce the adaptive cancellation time over prior cancelers. The architecture is not limited to use with LMS algorithms but is applicable, in general, to implementing any adaptive processing algorithm, such as for example, a recursive LMS. The architecture can be used to increase the processing speed and/or the number of degrees of freedom of the adaptive filter while providing whatever processing speed is required, the speed being limited only by approximately the processing time of the slowest element.

Figure 4:
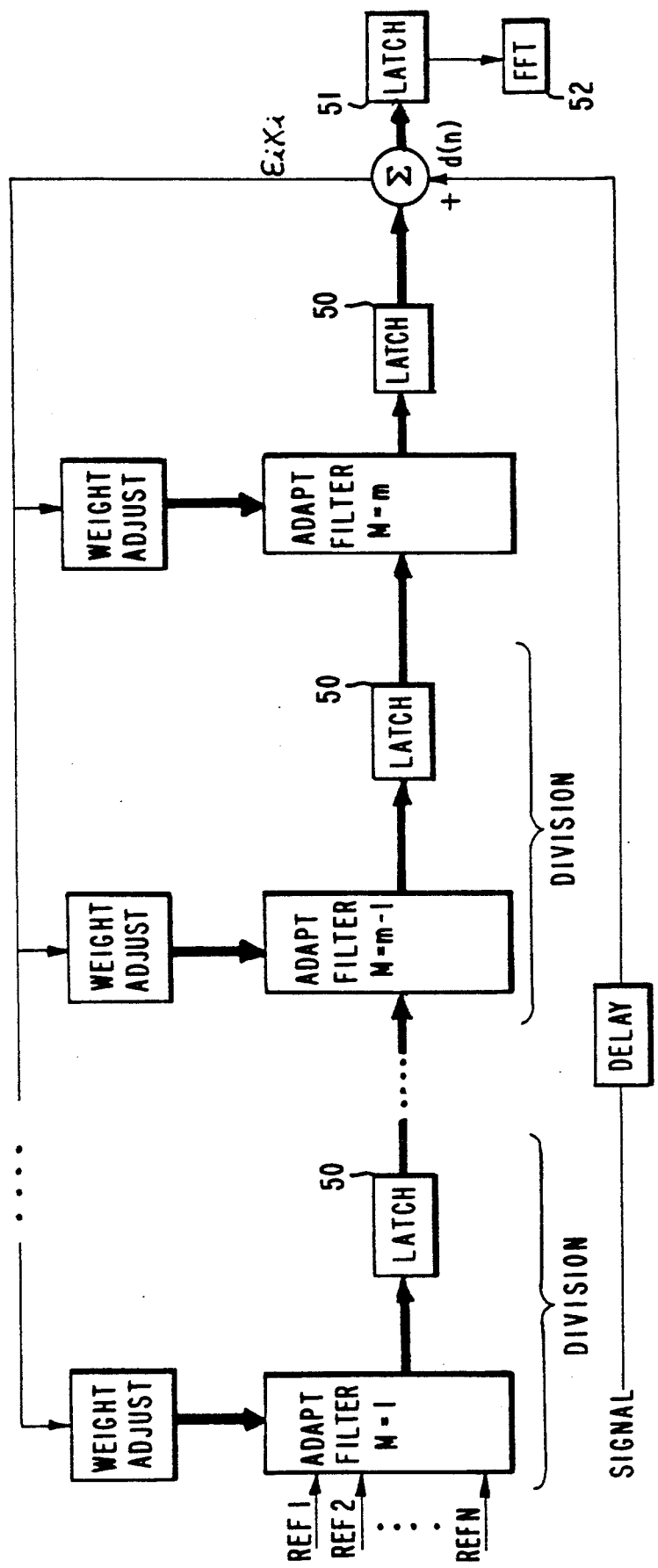
FIGS. 4 and 5 are block diagrams, which taken together, illustrate the distributed pipeline architecture of an adaptive canceler according to the present invention.
Figure 5:
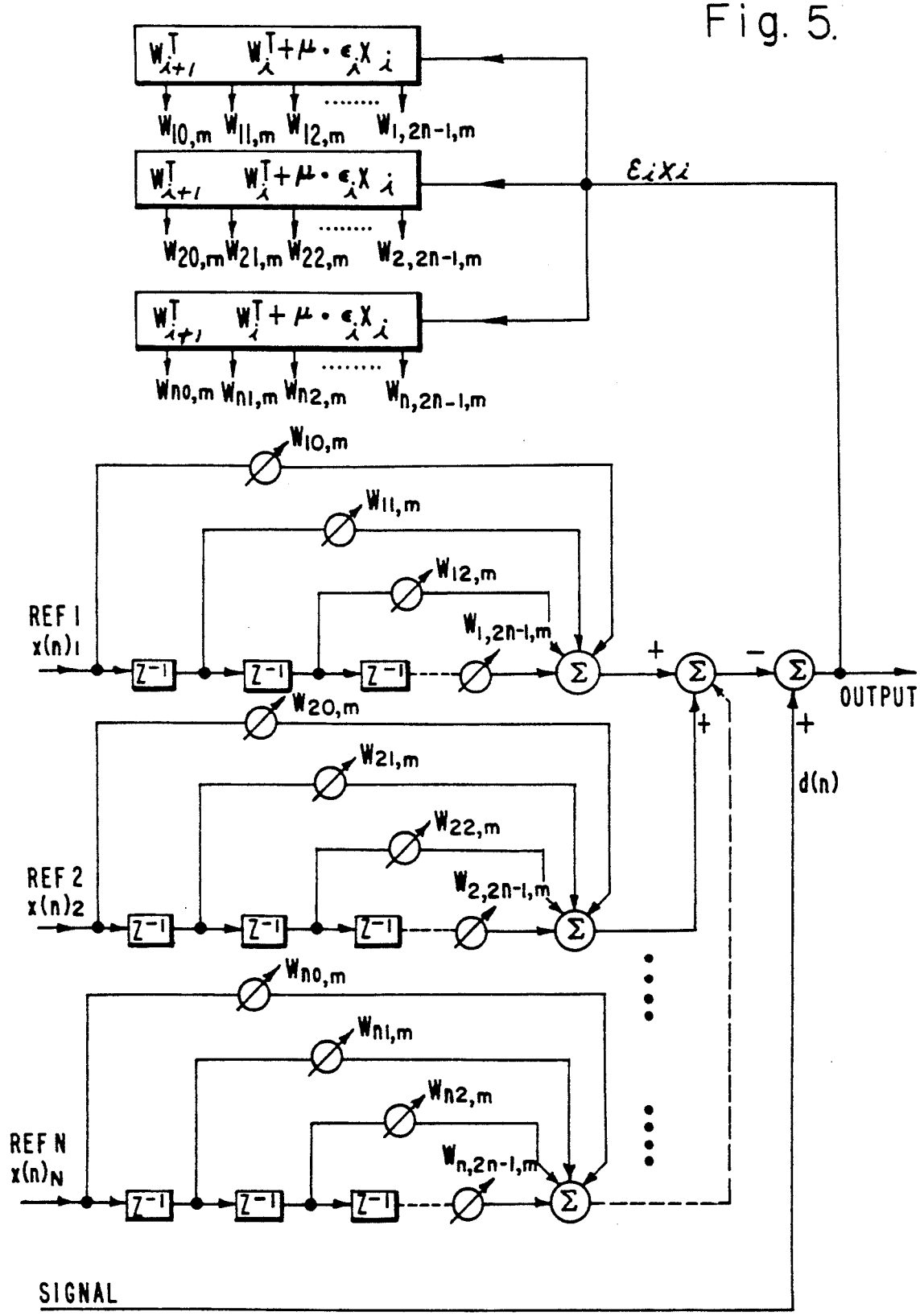

Referring now to FIGS. 4 and 5, there is shown a schematic block diagram of a multiple-reference-channel (reference channels 1 through N), multiple-tap (T represents the total number of taps) LMS adaptive canceler 32 having an architecture according to the present invention. FIG. 4 schematically illustrates the overall processing architecture. In the present invention, each reference channel of T taps is divided into a plurality of divisions (divisions 1 through M) so that each division has T/M taps. It will be recognized that the divisions, 1 through M, may have differing numbers of taps per division without departing from the concept of the present invention, but an equal number of taps per division is in general the preferred approach for most efficient processing.

FIG. 5 schematically illustrates the recurring basic structure of the processing architecture of each division M. As illustrated in FIG. 5 which shows the Mth division, each of the M divisions is an adaptive filter having multiple reference channels, 1 through N, that provides at its output a signal that has been weighted T/M times since it was received at the input of the division. Each division, 1-M, implements a conventional multiple-reference-channel adaptive filter. The T/Mth weight value and the T/Mth sample data (at the output of the division) are coupled to a pipeline buffer latch 50 and then are input to the next division where the next T/M weight values are applied to the output of the previous division. It can be seen that under this architecture, the adaptive filtering (application of T/M weights) is accomplished concurrently in each of the M divisions. The output of the Mth division is then applied to an output buffer latch 51. Thus the architecture of the present invention establishes a pipeline of adaptively filtered data from the input to division M=1, to the weighted data appearing on the output buffer latch 51 following division M. The adaptive processing time for N reference channels having a total of T taps, is effectively the time to process T/M taps in a conventional architecture. The speed of the buffer latches 50 and 51, being inherently very much greater than that of the adaptive filters 1-M, allows the processed data to be transferred from the adaptive filters so that processing is not delayed. In general, the latches in the preferred embodiment facilitate the pipeline architecture of the present invention by reducing the processing delay that occurs when a faster operating device must wait for an input from a slower operating device.

The digital data appearing on the output buffer latch 51 is a continuous stream of real-time, time-domain, adaptively-filtered data that corresponds to the acoustic signature of interest. This real-time data is available for analysis. This analysis may be accomplished in the time domain or in the frequency domain as previously noted. Considering time-domain analysis first, the adaptive canceler 32 is providing a continuous stream of digital signals which may be coupled directly from the output buffer latch 51 to the input of a digital computer. The computer may process the time domain signals and analyze them by integrating them over time and comparing the integrated signals to threshold values indicating a characteristic or value of interest. The time domain signals may be used to generate ordered data and this ordered data may be comparatively analyzed by the computer according to a predefined template.

For frequency-domain analysis the adaptive canceler output is coupled by way of the latch 51 to a conventional Fourier transform filter circuit 52. The Fourier transform filter circuit 52 is adapted to perform an N-point complex Fourier transform on the input digital signals provided by the adaptive canceler 32 to provide a spectral distribution of the signal of interest. The output of the Fourier transform filter circuit 52 may be sampled at an overlap to further increase the effective data rate of the adaptive analysis apparatus. For example, sampling the output of the filter circuit 52 at a 50 percent overlap effectively doubles the rate at which data is available for analysis.

Figure 6:
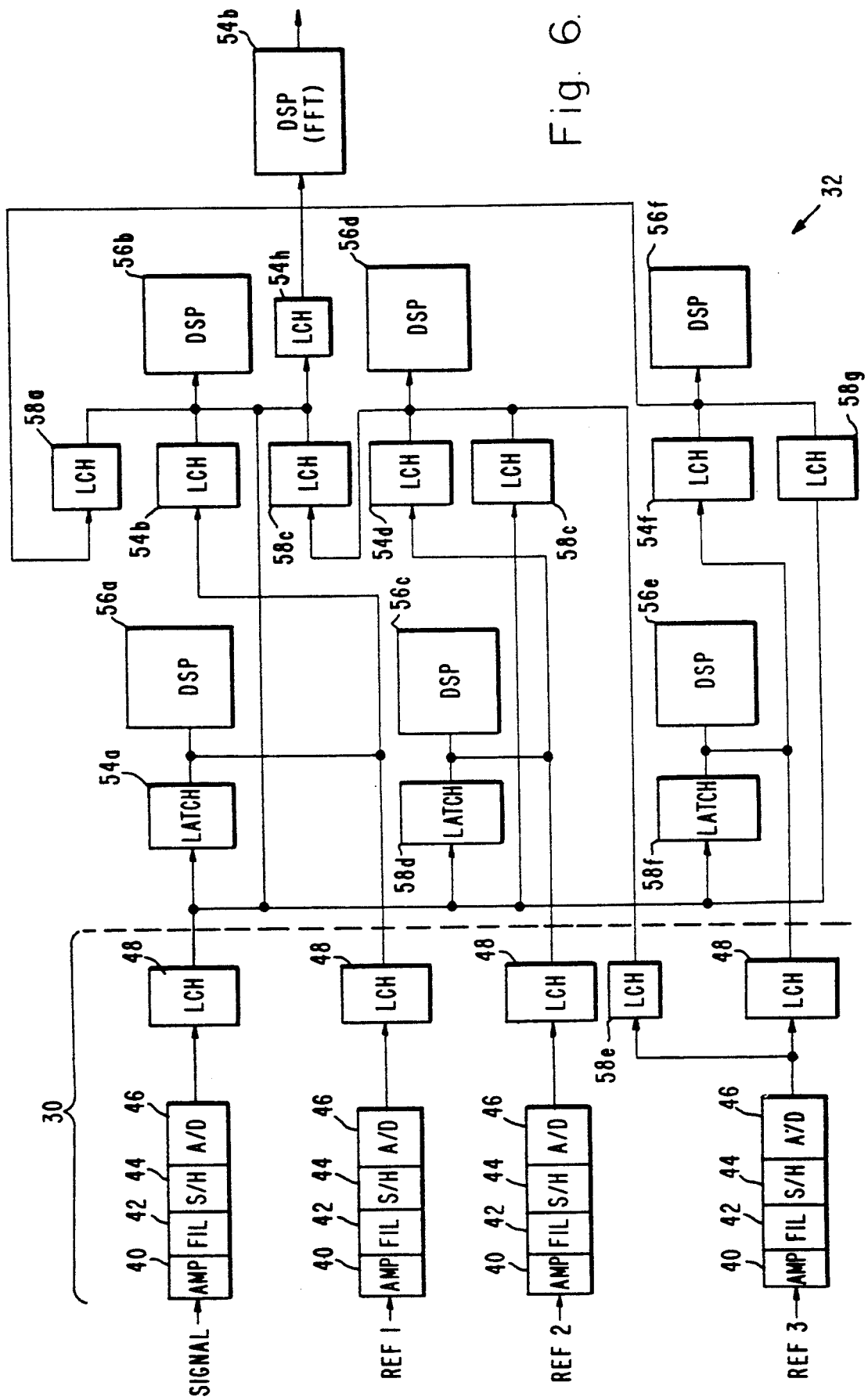
FIG. 6 is a high-level physical interconnection diagram illustrating an embodiment of an adaptive canceler in accordance with the invention.
Figure 7:
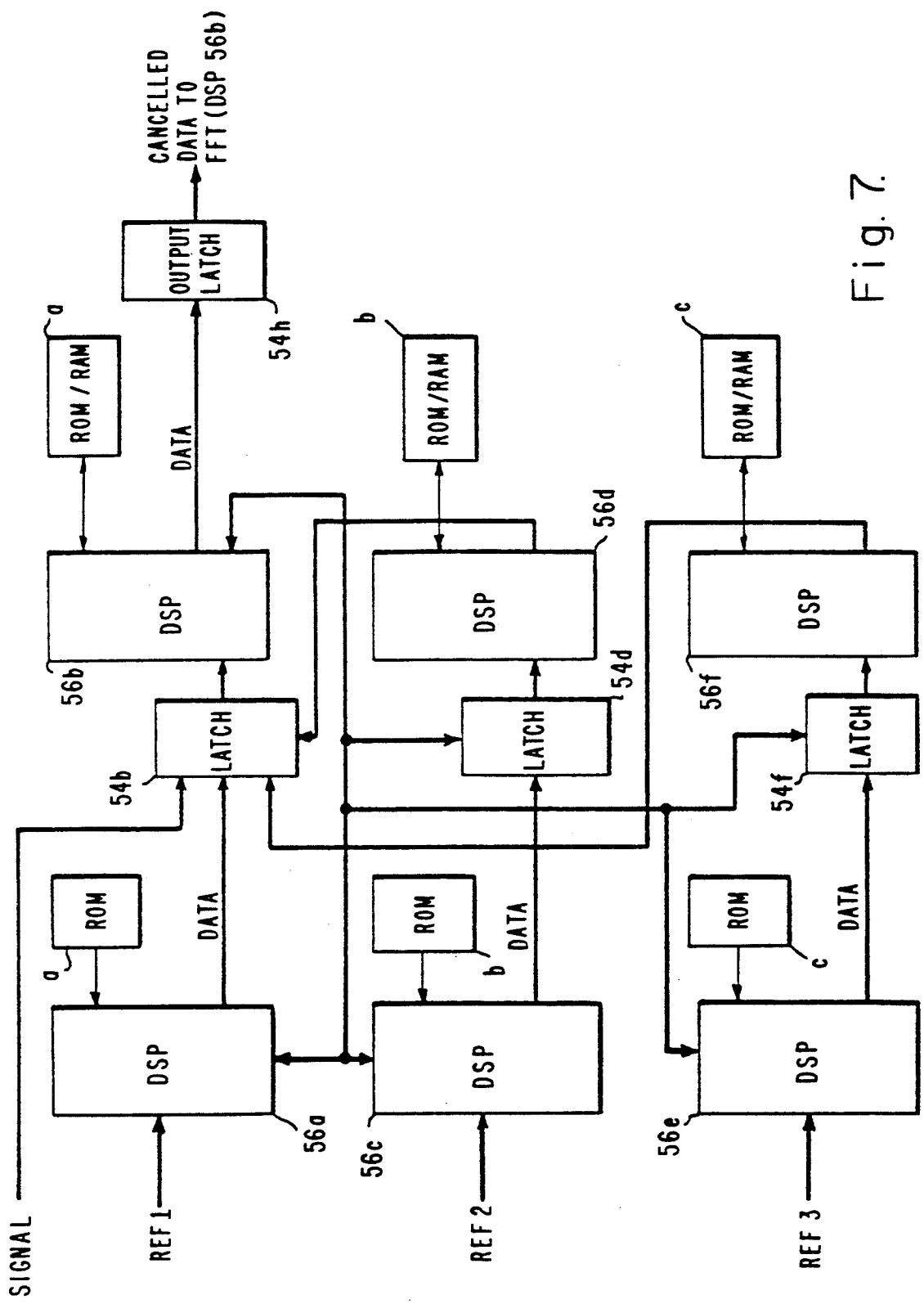
FIG. 7 is a block diagram illustrating the data path of the adaptive canceler of FIG. 6.
Figure 8:
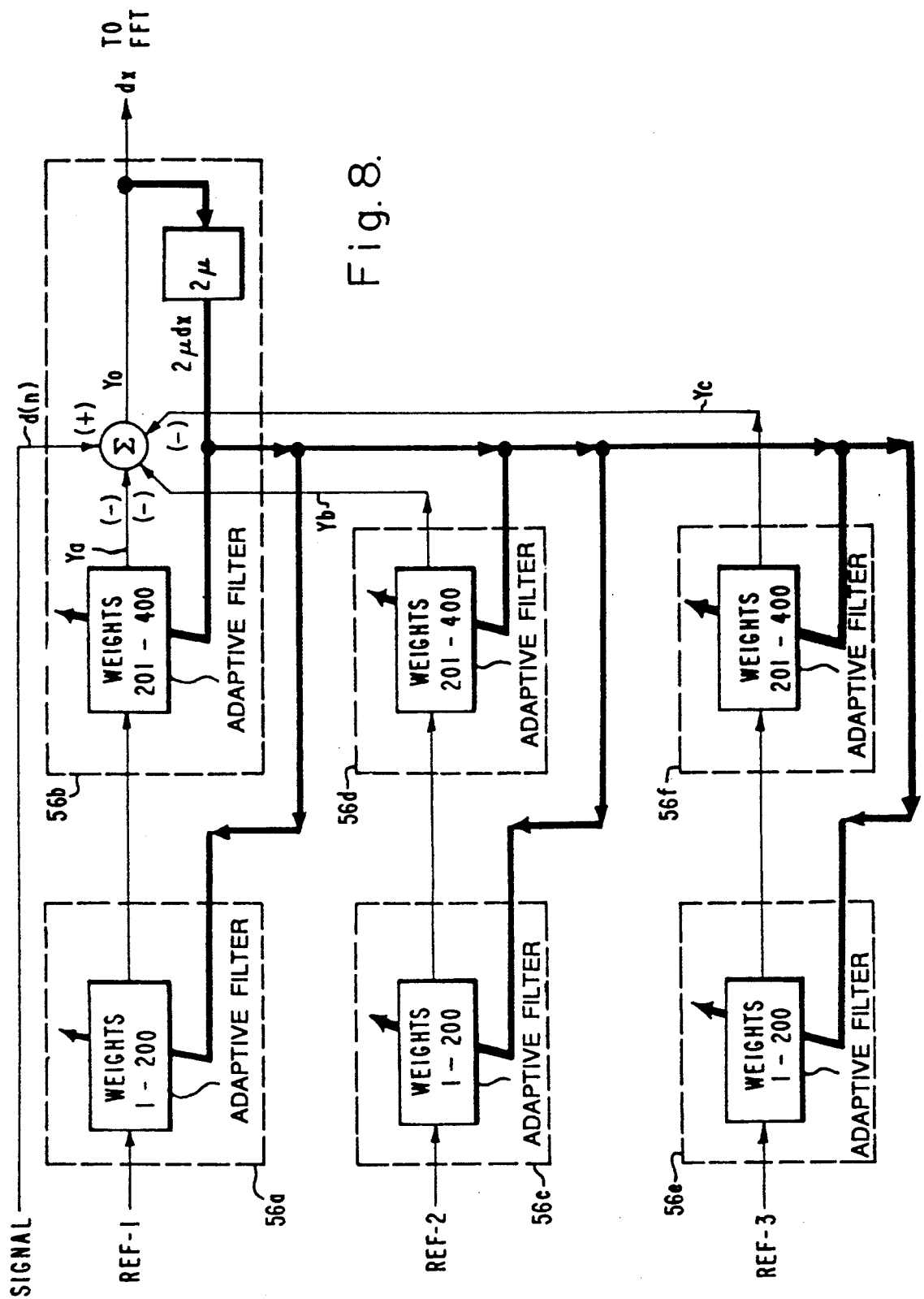
FIG. 8 is a diagram illustrating the distributed architecture of a four-channel adaptive canceler in accordance with the principles of the invention;.

FIGS. 6, 7 and 8 illustrate a four channel (a signal channel and 3 reference channels) adaptive canceler 32 of the embodiment of the adaptive analysis apparatus discussed hereinbefore. Referring to FIG. 6, the outputs of the buffer latches 48 of each channel (signal and references 1-3) of the signal conditioning circuit 30 are coupled to the adaptive filter 32 which comprises a plurality of input latches 54a, 54b, 54d, and 54f, six digital signal processor (DSP) circuits 56a-56f, seven pipeline latches 58a-58g, and an output latch 54h. The processor circuits used in this embodiment are Texas Instruments model TMS 320C25 Digital Signal Processor and the latches 54 and 58 are Texas Instruments model 74ALS244. The wiring and interconnection of these circuits are generally well-known in the art and will not be discussed in detail. Application notes from the manufacturer are available that describe the wiring and operation of these circuits.

FIG. 7 illustrates the data path in the embodiment of a four channel LMS adaptive filter used in the architecture of the present invention. Data from the primary sensor (SIGNAL) is coupled by way of latch 54b to the second digital signal processor 56b. Data from the first, second and third reference sensors are coupled to the first, third and fifth processors 56a, 56c, 56e, respectively. Data processed by the first, third and fifth processors 56a, 56c, 56e are coupled by way of latches 54b, 54d, 54f to the second, fourth and sixth processors 56b, 56d, 56f. The first and second processors 56a, 56b implement the Least Means Square adaptive filter having distributed weights. In particular, the first processor 56a processes the first 200 weights, while the second processor 56b processes the second 200 weights. Similarly, the third and fourth processors 56c, 56d, and the fifth and sixth processors 56e, 56f implement least means square adaptive filters having distributed weights, respectively. Additionally, the second processor 56b combines the primary signal with the adaptively-filtered noise signals processed by the adaptive filters and generates coefficient update terms for each of the adaptive processors 56a-56f. In particular, the second processor 56b computes the expression $$\epsilon = d(n) - \sum_{k=1}^{m} W(k)x(n-k)$$

and generates weight update factors which are defined by the expression $W(k+1)=W(k)+2\mu\epsilon x(n-k)$. Coefficient update terms are provided from the second processor to each of the other processors 56a, 56c-56f along the data path indicated in FIG. 7. The random access memory (RAM) and the read only memory (ROM) blocks in FIG. 7 indicate the instructions for implementing the LMS filter algorithm in the DSP's 56a-56f according to the programming instructional language of the devices.

FIG. 8 is a diagram illustrating the distributed architecture of the four channel adaptive filter of the embodiment discussed herein. The computations performed by the six processors 56a-56f are defined by the following equations. $Y_a=R_1+R_2$, $Y_b=R_3+R_4$, and $Y_c=R_5+R_6$, where $R_1$ is the partial weight result produced by the first stage processor 56a, $R_2$ is the partial weight result produced by the second stage processor 56b, $R_3$ is the partial weight result produced by the first stage processor 56c, $R_4$ is the partial weight result produced by the second stage processor 56d, $R_5$ is the partial weight result produced by the first stage processor 56e, and $R_6$ is the partial weight result produced by the second stage processor 56f, and where $$R_1 = \frac{1}{2^{16}} \sum_{k=1}^{200} W(k)x(n)_{1k} + 8000H$$

$$R_2 = \frac{1}{2^{16}} \sum_{k=201}^{400} W(k)x(n)_{1k} + 8000H$$

$$R_3 = \frac{1}{2^{16}} \sum_{k=1}^{200} W(k)x(n)_{2k} + 8000H$$

$$R_4 = \frac{1}{2^{16}} \sum_{k=201}^{400} W(k)x(n)_{2k} + 8000H$$

$$R_5 = \frac{1}{2^{16}} \sum_{k=1}^{200} W(k)x(n)_{3k} + 8000H$$

$$R_6 = \frac{1}{2^{16}} \sum_{k=1}^{400} W(k)x(n)_{3k} + 8000H$$

and 8000H (Hex) is a round off factor equal to one half the least significant bit.

$$Y_0 = 4(Y_a + Y_b + Y_c),$$

where the factor 4 is a scaling factor. $\epsilon = d(n) - Y_0$, which comprises the error, and $\mu\epsilon = (2\mu\epsilon + 8000H)/2^{16}$, which produces a 16 bit normalization of the error and where $\mu$ is equal to 1000 Hex.

More particularly, the multi-channel adaptive filter computes the partial value $R_1$ in processor 56a, carries this value and the 200th sample data to processor 56b, computes the partial value $R_2$ and provides the resultant $Y_a$ to the summing junction. A similar process is followed for the calculation of partial sum $R_2$ in processor 56c, partial $R_2$ in processor 56d, and the calculation of $Y_b$. The calculation of partial $R_2$ in processor 56e and partial $R_2$ in processor 56f follow the same process to produce the resultant $Y_c$. The resultants are summed in the second processor 56b as indicated in FIG. 8. The effective error term is then multiplied by 21, and used to update the weight coefficients of the filter based on the nature of the undesired ambient energy that is being filtered from the primary signals. A digital process delay equal to approximately one-half the delay through the total taps (a delay equal to the delay through taps 1-200 in this case) is included in the primary channel only, to assure convergence to the ideal Wiener solution.

Although 400 taps were shown in this embodiment, this is not meant to be restrictive of the invention. More or fewer taps may be used depending upon the particular application.

A brief discussion of the processing capabilities of an actually constructed embodiment will illustrate the usefulness of the adaptive analysis apparatus. The constructed apparatus is a four channel device (one signal channel and 3 reference channels) and has a system sample rate of 20,000 Hz per channel. The adaptive canceler implements the LMS algorithm having 400 fixed taps, a variable convergence factor, a primary channel delay equivalent to 200 taps, and a basic processing rate of $100 \times 10^{-6}$ seconds (the DSP processing rate). This provides a throughput of 1024-point complex FFT at a rate of 10 FFT's per second with no FFT overlap. With a 50 percent overlap, the apparatus provides a 1024-point complex FFT at a rate of 20 FFT per second. This results in a digital spectrum for analysis approximately every 50 milliseconds. The apparatus can be expanded to include more channels and more taps while maintaining approximately the same throughput through the use of the distributed architecture described hereinbefore for the adaptive canceler section 34.

It will be apparent that the adaptive analysis apparatus has numerous applications. The apparatus has been described in connection with assembly line quality-control testing of automotive transmissions. However, the apparatus is useful in quality control testing or analysis of any device having an acoustic signature which is related in some manner to the present or prospective operability of the device. The apparatus may be used in analyzing the acoustic signatures of defective devices to determine the exact defect or as a preventive maintenance tool to periodically monitor a device to identify present or prospective problems. The apparatus can be employed to continuously monitor the acoustic signature of an operating device, or a critical component in a device, to indicate any relevant change in the acoustic signature and provide a signal indicating a possible problem or hazard. The apparatus can be used as a passive acoustic signal detector in the presence of contaminating noise in a manner similar to a passive radar receiver by continuously canceling the noise from the signal channel so that the appearance of new acoustic data in the signal channel will be immediately detected and comparatively analysed against predetermined reference data. The ability to both adaptively process large amounts of acoustical information and analyze the acoustical information in real-time provided by the present invention is applicable to almost any situation where valuable information is contained in an acoustical signal of interest.

It is to be understood that the above-described embodiments are merely illustrative of some of the many embodiments which represent applications of the principles of the present invention. Other arrangements can be readily devised by those skilled in the art without departing from the scope of the invention and the invention is meant to include such arrangements unless specifically limited by the claims.

What is claimed is:

1. An adaptive canceler apparatus comprising:
   primary signal sensor means for receiving a primary signal comprising a signal of interest generated by a device of interest and also comprising a first noise component;
   reference sensor means; and
   adaptive canceler means coupled to said primary signal sensor means and to said reference sensor means for adaptively combining said noise signals with said primary reference signal to provide a noise canceled signal comprising the signal of interest generated by the device of interest and a second noise component, said second noise component having a smaller amplitude than said first noise component.
   said adaptive canceler means comprising a first digital adaptive filter and a second digital adaptive filter coupled in series, said first digital adaptive filter performing a first number of weight adjustments based on feedback from said noise canceled signal to provide an intermediate output signal;
   said second digital adaptive filter receiving said intermediate output signal and performing a second number of weight adjustments based on feedback from said noise canceled signal to provide said noise canceled signal at the output of said adaptive canceler means, said noise canceled signal being one that has been adaptively weighted by said first and second number of weight adjustments.

* * * * *